United States Patent
Hu et al.

(10) Patent No.: US 12,452,118 B2
(45) Date of Patent: Oct. 21, 2025

(54) LTF AND STF TRANSMISSION FOR WIDE BANDWIDTH 240MHz WITH MORE DC TONES IN WIRELESS COMMUNICATIONS

(71) Applicant: MediaTek Inc., Hsinchu (TW)

(72) Inventors: Shengquan Hu, San Jose, CA (US); Ching-Wen Hsiao, Hsinchu (TW); Jianhan Liu, San Jose, CA (US); Thomas Edward Pare, Jr., San Jose, CA (US)

(73) Assignee: MediaTek Inc. (TW)

( * ) Notice: Subject to any disclaimer, the term of this patent is extended or adjusted under 35 U.S.C. 154(b) by 65 days.

(21) Appl. No.: 18/515,311

(22) Filed: Nov. 21, 2023

(65) Prior Publication Data
US 2024/0171438 A1    May 23, 2024

Related U.S. Application Data

(60) Provisional application No. 63/384,785, filed on Nov. 23, 2022.

(51) Int. Cl.
*H04L 27/26* (2006.01)
*H04L 5/00* (2006.01)

(52) U.S. Cl.
CPC ........ *H04L 27/2613* (2013.01); *H04L 5/0007* (2013.01); *H04L 5/0048* (2013.01)

(58) Field of Classification Search
CPC . H04L 27/2613; H04L 5/0007; H04L 5/0048; H04L 27/26134; H04W 80/06
See application file for complete search history.

(56) References Cited

U.S. PATENT DOCUMENTS

| | | | |
|---|---|---|---|
| 2021/0281376 A1* | 9/2021 | Park | H04L 5/0044 |
| 2022/0029772 A1* | 1/2022 | Wu | H04L 5/0048 |
| 2022/0140962 A1 | 5/2022 | Park et al. | |

FOREIGN PATENT DOCUMENTS

| | | |
|---|---|---|
| WO | WO 2021251591 A1 | 12/2021 |
| WO | WO 2024055989 A1 | 3/2024 |

OTHER PUBLICATIONS

European Patent Office, Partial European Search Report in European Patent Application No. 23211682.2-1203, Apr. 22, 2024.
Eunsung Park (LG Electronics): "Considerations on PHY Designs for mmWave Band", IEEE-Draft; vol. 802.11 UHR, Nov. 13, 2022, pp. 1-16, XP068198980.

* cited by examiner

*Primary Examiner* — David S Huang
(74) *Attorney, Agent, or Firm* — Andy M. Han; Han IP PLLC

(57) ABSTRACT

Various schemes pertaining to long training field (LTF) and short training field (STF) transmission for wide bandwidth 240 MHz with more direct-current (DC) tones in wireless communications are described. A processor of an apparatus generates either or both of an LTF and a STF of a physical-layer protocol data unit (PPDU) with a center 996-tone resource unit (RU) having more than a predetermined number of DC tones. The processor then performs a wireless communication in a wide bandwidth (e.g., 240 MHz) with the PPDU.

18 Claims, 14 Drawing Sheets

(A)

UHR_LTF240M_4x =
[c(1)*LTF80MHz_subblock_left_4x, 05, c(2)*LTF80MHz_subblock_right_4x, 023,
c(3)*LTF80MHz_subblock_left_4x, 05, c(4)*LTF80MHz_subblock_right_4x, 023,
c(5)*LTF80MHz_subblock_left_4x, 05, c(6)*LTF80MHz_subblock_right_4x]

(B)

| Case # | RU/MRU Type | # of RU/MRU | BPSK Median | Worst PAPR (1~8ss) |
|---|---|---|---|---|
| 1 | 26 | 108 | 5.87 | 4.20 |
| 2 | 52 | 48 | 6.65 | 4.64 |
| 3 | 106 | 24 | 7.27 | 4.90 |
| 4 | 242 | 12 | 7.90 | 5.42 |
| 5 | 484 | 6 | 8.39 | 5.71 |
| 6 | 996 | 3 | 8.97 | 5.86 |
| 7 | 52+26 | 24 | 7.04 | 6.35 |
| 8 | 106+26 | 12 | 7.43 | 5.76 |
| 9 | 484+242 | 12 | 8.88 | 7.83 |
| 10 | 996+484 | 8 | 9.30 | 7.85 |
| 11 | 2x996 | 3 | 9.34 | 8.67 |
| 12 | 2x996+484 | 6 | 9.37 | 8.30 |
| 13 | 3x996 | 1 | 9.37 | 7.83 |

UHR_LTF240M_4x =
[c(1)*LTF80MHz_subblock_left_4x, 05, c(2)*LTF80MHz_subblock_right_4x, 023,
c(3)*LTF80MHz_subblock_left_4x, 05, c(4)*LTF80MHz_subblock_right_4x, 023,
c(5)*LTF80MHz_subblock_left_4x, 05, c(6)*LTF80MHz_subblock_right_4x]

(B)

(A)

UHR_LTF240M_4x =
[c(1)*LTF80MHz_subblock_left_4x, O5, c(2)*LTF80MHz_subblock_right_4x, O23,
c(3)*LTF80MHz_subblock_left_4x, O5, c(4)*LTF80MHz_subblock_right_4x, O23,
c(5)*LTF80MHz_subblock_left_4x, O5, c(6)*LTF80MHz_subblock_right_4x]

(B)

(A)

```
[c(1) *LTF80MHz_left_4x  05    c(2) *LTF80MHz_right_4x  014  ...
 c(3) *LTF80MHz_left_4x  023   c(4) *LTF80MHz_right_4x  014  ...
 c(5) *LTF80MHz_left_4x  05    c(6) *LTF80MHz_right_4x];
```

900

(B)

1100

(A)

```
[c(1)*LTF80MHz_left_4x        O5    c(2)*LTF80MHz_right_4x  O14 ...
 c(3)*[L9 LTF80MHz_left_4x]   O5    c(4)*[LTF80MHz_right_4x R9] O14 ...
 c(5)*LTF80MHz_left_4x        O5    c(6)*LTF80MHz_right_4x  O14 ...];
```

(B)

LTF AND STF TRANSMISSION FOR WIDE BANDWIDTH 240MHz WITH MORE DC TONES IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/384,785, filed 23 Nov. 2022, the content of which being incorporated by reference in its entirety.

TECHNICAL FIELD

The present disclosure is generally related to wireless communications and, more particularly, to long training field (LTF) and short training field (STF) transmission for wide bandwidth 240 MHz with more direct-current (DC) tones in wireless communications.

BACKGROUND

Unless otherwise indicated herein, approaches described in this section are not prior art to the claims listed below and are not admitted as prior art by inclusion in this section.

In wireless communications, such as Wi-Fi (or WiFi) and wireless local area network (WLAN) under one or more Institute of Electrical and Electronics Engineers (IEEE) specifications, resource unit (RU) and multi-RU (MRU) tone plan designs have been proposed by using an 80 MHz RU tone plan as a basic building block. In the RU and MRU tone plan designs, five DC tones are reserved. However, for wider bandwidth, such as 240 MHz, DC leakage tends to be more severe and would likely cause performance degradation. Therefore, there is a need for a solution of LTF and STF transmission for wide bandwidth 240 MHz with more DC tones in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to LTF and STF transmission for wide bandwidth 240 MHz with more DC tones in wireless communications. Under various proposed schemes described herein, a 4× LTF sequence design (e.g., based on an IEEE 802.11be 80 MHz subblock) may be utilized for wide bandwidths such as 240 MHz. Moreover, several design options are proposed with peak-to-average power ratio (PAPR) performance evaluated for comparison. It is believed that implementations of the proposed schemes may address or otherwise alleviate aforementioned issues.

In one aspect, a method may involve generating either or both of an LTF and a STF of a physical-layer protocol data unit (PPDU) with a center 996-tone RU having more than a predetermined number of DC tones. The method may also involve performing a wireless communication in a wide bandwidth with the PPDU.

In another aspect, an apparatus may include a transceiver and a processor coupled to the transceiver. The transceiver may be configured to transmit and receive wirelessly. The processor may be configured to generate either or both of an LTF and a STF of a physical-layer protocol data unit (PPDU) with a center 996-tone RU having more than a predetermined number of DC tones. The method may also involve performing a wireless communication in a wide bandwidth with the PPDU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a diagram of an example design in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to LTF and STF transmission for wide bandwidth 240 MHz with more DC tones in wireless communications. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M, a bandwidth of 480 MHz may be interchangeably denoted as BW480 or BW480M, and a bandwidth of 640 MHz may be interchangeably denoted as BW640 or BW640M.

Figure 1:
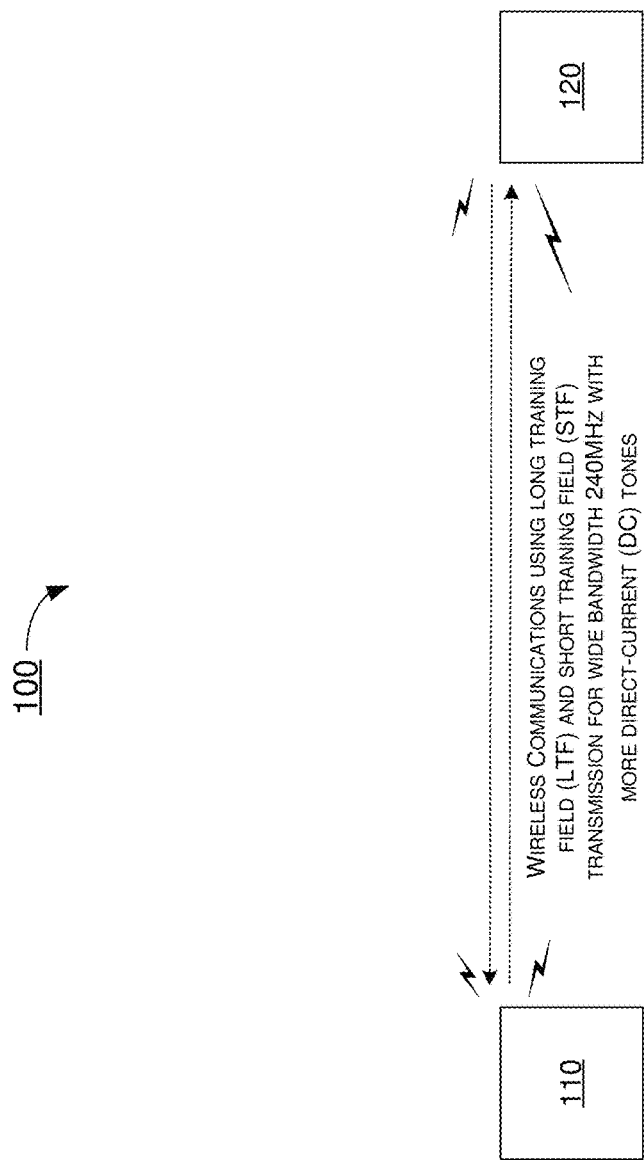
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 14 illustrate examples of implementation of various proposed schemes in network environment 100 in accordance with the present disclosure. The following description of various proposed schemes is provided with reference to FIG. 1~FIG. 14.

Referring to FIG. 1, network environment 100 may involve at least a station (STA) 110 communicating wirelessly with a STA 120. Either of STA 110 and STA 120 may function as an access point (AP) STA or, alternatively, a non-AP STA. In some cases, STA 110 and STA 120 may be associated with a basic service set (BSS) in accordance with one or more IEEE 802.11 standards (e.g., IEEE 802.11be and/or future-developed standards). Each of STA 110 and STA 120 may be configured to communicate with each other by utilizing the LTF and STF transmission for wide bandwidth 240 MHz with more DC tones in wireless communications in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Figure 2:
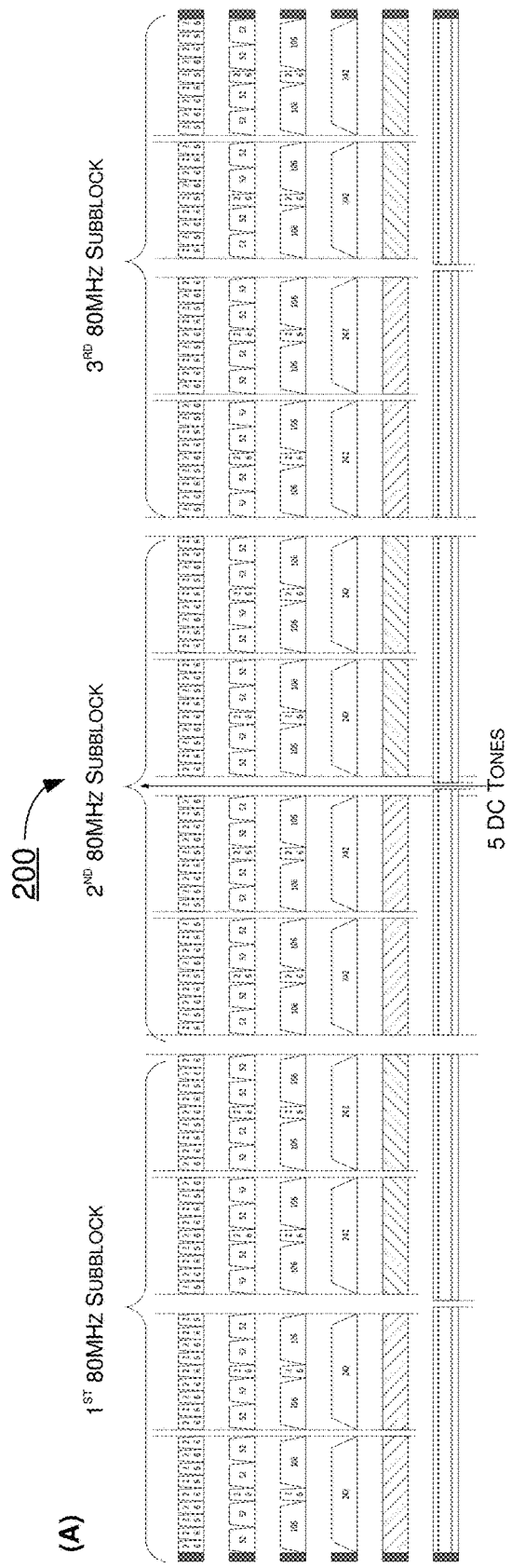
FIG. 2 is a diagram of an example scenario in accordance with an implementation of the present disclosure.

FIG. 2 illustrates an example scenario 200 in accordance with an implementation of the present disclosure. Scenario 200 may pertain to a RU tone plan for BW240 with five DC tones. Referring to part (A) of FIG. 2, the RU tone plan for BW240 may be comprised of three (left, middle and right) 80 MHz subblocks (namely: first ($1^{st}$) 80 MHz subblock, second ($2^{nd}$) 80 MHz subblock and third ($3^{rd}$) 80 MHz subblock) with five DC tones in the center of the middle (or $2^{nd}$) 80 MHz subblock. Referring to part (B) of FIG. 2, the table shows a list of RU/MUR types (in terms of number of tones in a given RU/MRU) and respective numbers of RU/MRUs transmittable in BW240.

FIG. 3 illustrates an example design 300 in accordance with an implementation of the present disclosure. Design 300 may pertain to an optimized LTF sequence and PAPR performance for BW240. Under the proposed scheme, a four times (4×) of ultra-high reliability (UHR) LTF (UHR-LTF) sequence for BW240 (herein interchangeably denoted as "UHR-LTF240M_4×") may be expressed as: UHR-LTF240M_4×=[c(1)*LTF$_{80MHz\_subblock\_left\_4\times}$, $0_5$, c(2) *LTF$_{80MHz\_subblock\_right\_4\times}$, $0_{23}$, c(3) *LTF$_{80MHz\_subblock\_left\_4\times}$, $0_5$, c(4) *LTF$_{80MHz\_subblock\_right\_4\times}$, $0_{23}$, c(5) *LTF$_{80MHz\_subblock\_left\_4\times}$, $0_5$, c(6) *LTF$_{80MHz\_subblock\_right\_4\times}$], as shown in part (A) of FIG. 3. In the present disclosure, a vector C may denote a combination of optimized coefficients=[c(1) c(2) c(3) c(4) c(5) c(6)]=[−1 −1 −1 1 1 1] or [−1 −1 1 −1 1 1] or [1 1 −1 1 −1 −1] or [1 1 1 −1 −1 −1]. Here, "$0_5$" denotes five consecutive 0s, and "$0_{23}$" denotes twenty-three consecutive 0s. Moreover, LTF$_{80MHz\_subblock\_left\_4\times}$ denotes a left half of the 80 MHz subblock base sequence with the 78.125 kHz subcarrier spacing, and LTF$_{80MHz\_subblock\_right\_4\times}$ denotes a right half of the 80 MHz subblock base sequence with the 78.125 kHz subcarrier spacing. The optimized coefficients are chosen to achieve the minimum PAPR of LTF sequences over all RU and MRU types/sizes in BW240 with the 4× UHR-LTF sequence under the proposed scheme. Referring to part (B) of FIG. 3, the right-most column in the table shows the worst PAPR (in dB) of UHR-LTF for a number of spatial stream (Nss) ranging from one to eight for various combinations of RU/MRU types and various of RU/MRU sizes. In the present disclosure, the term "4×" refers to four times of the frequency of tones in the LTF relative to a legacy LTF. In other words, the subcarrier spacing in a 4× LTF sequence under the proposed schemes may be 78.125 kHz (as opposed to 312.5 kHz for legacy LTF).

Figure 4:
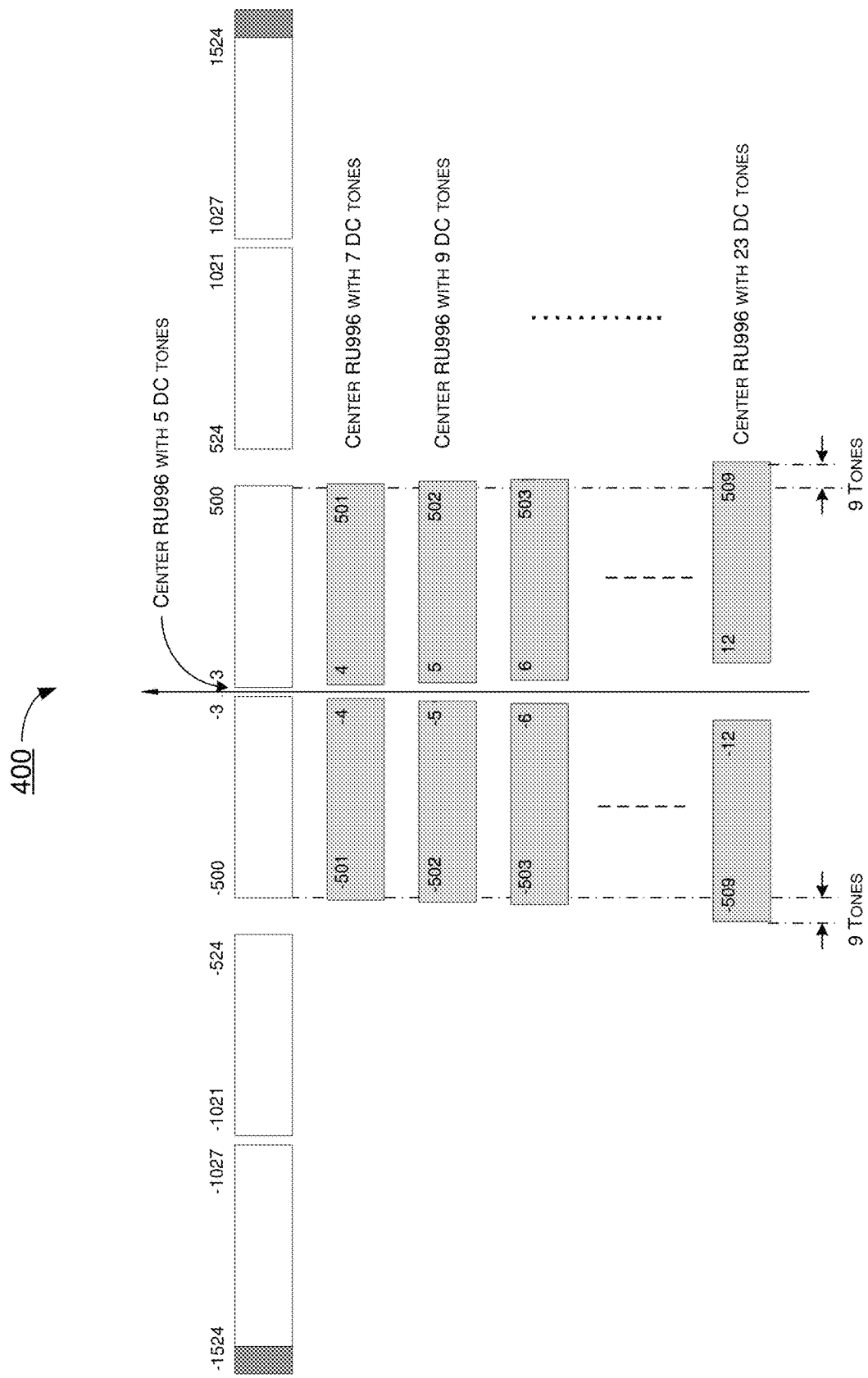
FIG. 4 is a diagram of an example design in accordance with an implementation of the present disclosure.

FIG. 4 illustrates an example design 400 in accordance with an implementation of the present disclosure. Design 400 may pertain to a tone plan for a center 996-tone RU (RU996) with more DC tones in BW240. Referring to FIG. 4, under the proposed scheme, the number of DC tones in the center of the tone plan (namely, the center RU996) may be increased from five to seven, nine, and so on and up to a much larger number such as 23. Under the proposed scheme, to reserve more DC tones for BW240, the center RU996 may be designed by shifting a number of tones (e.g., shift by 1, 2, 3, . . . , 9 tones) away from the center for both sides as shown in FIG. 4. For example, the first center RU996 from the top in FIG. 4 has tone indices ranging from −500 to −3 and from 3 to 500, and it has 5 DC tones with tone indices of −2, −1, 0, 1, 2. Similarly, the second center RU996 from the top in FIG. 4 has tone indices ranging from −501 to −4 and from 4 to 501, and it has 7 DC tones with tone indices of −3, −2, −1, 0, 1, 2, 3. Likewise, the third center RU996 from the top in FIG. 4 has tone indices ranging from −502 to −5 and from 5 to 502, and it has 9 DC tones with tone indices of −4, −3, −2, −1, 0, 1, 2, 3, 4. Other center RU996 shown in FIG. 4 have even more DC tones. As an example, the last center RU996 from the top (or the bottom center RU996) in FIG. 4 has tone indices ranging from −509 to −12 and from 12 to 509, and it has 23 DC tones with tone indices of −11, −10, −9, −8, −7, −6, −5, −4, −3, −2, −1, 0, 1, 2, 3, 4, 5, 6, 7, 8, 9, 10, 11. Compared to the first center RU996 from the top, the bottom center RU996 in FIG. 4 may be seen as having a left portion and a right portion (with 23 DC tones therebetween) being shifted to the left by 9 tones and to the right be 9 tones, respectively. Moreover, FIG. 4 shows an example that there may additionally be a right RU996 (e.g., with tone indices of [524:1021, 1027:1524]) and a left RU996 (e.g., with tone indices of [−1524:−1027, −1021:−524]) to the right and left sides of the center RU996 (e.g., with tone indices of [−500:−3, 3:500]).

Figure 5:
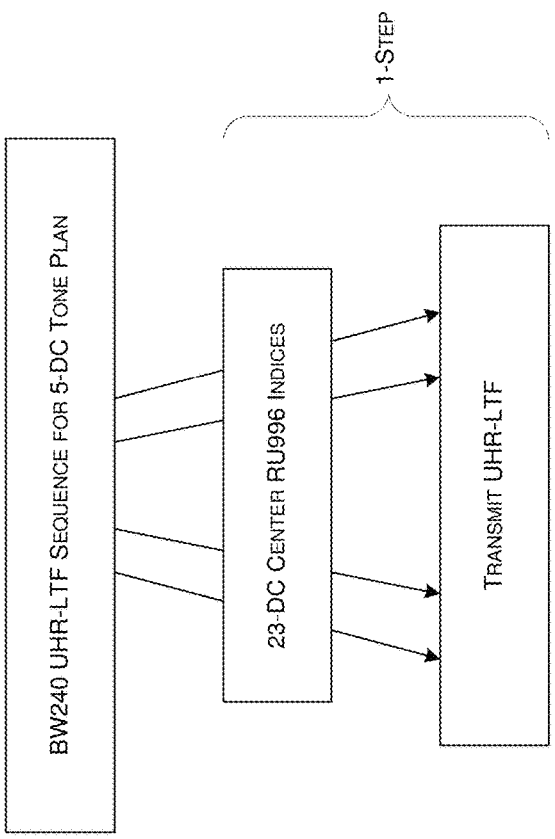
FIG. 5 is a diagram of an example design in accordance with an implementation of the present disclosure.

FIG. 5 illustrates an example design 500 in accordance with an implementation of the present disclosure. Design 500 may pertain to a one-step LTF transmission operation for BW240 with more DC tones under a first option (Option-0). Under Option-0, an optimized LTF sequence with five DC tones of design 300 may be reused or otherwise re-utilized. That is, in design 500, UHR-LTF240M_4×=[c(1)
*LTF$_{80MHz\_subblock\_left\_4\times}$, 0$_5$, c(2)
*LTF$_{80MHz\_subblock\_right\_4\times}$, 0$_{23}$, c(3)
*LTF$_{80MHz\_subblock\_left\_4\times}$, 0$_5$, c(4)
*LTF$_{80MHz\_subblock\_right\_4\times}$, 0$_{23}$, c(5)
*LTF$_{80MHz\_subblock\_left\_4\times}$, 0$_5$, c(6)
*LTF$_{80MHz\_subblock\_right\_4\times}$], with C=[c(1) c(2) c(3) c(4) c(5) c(6)]=[−1 −1 −1 1 1 1] or [−1 −1 1 −1 1 1] or [1 1 −1 −1 −1 −1] or [1 1 1 1 −1 −1]. Here, "0$_5$" denotes five consecutive 0s, and "0$_{23}$" denotes twenty-three consecutive 0s. Moreover, LTF$_{80MHz\_subblock\_left\_4\times}$ denotes a left half of the 80 MHz subblock base sequence with the 78.125 kHz subcarrier spacing, and LTF$_{80MHz\_subblock\_right\_4\times}$ denotes a right half of the 80 MHz subblock base sequence with the 78.125 kHz subcarrier spacing. In design 500, tone indices of a center RU996 of the 5-DC tone plan may be mapped to corresponding tone positions or indices of a center RU996 of a UHR-LTF with more than a predetermined number of (e.g., more than five) DC tones (e.g., seven, nine, eleven or another number, such as twenty-three DC tones as shown in FIG. 5), and then the UHR-LTF may be transmitted (e.g., from STA 110 to STA 120, or vice versa).

Figure 6:
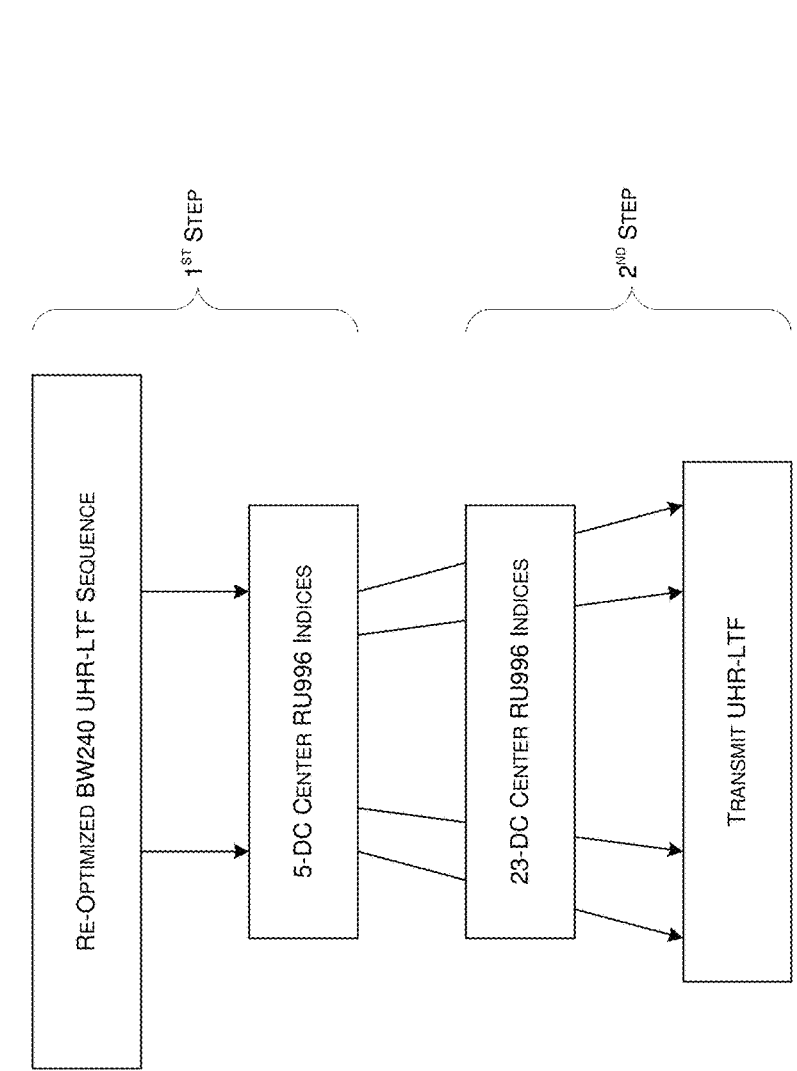
FIG. 6 is a diagram of an example design in accordance with an implementation of the present disclosure.

FIG. 6 illustrates an example design 600 in accordance with an implementation of the present disclosure. Design 600 may pertain to a two-step LTF transmission operation for BW240 with more DC tones under a second option (Option-1). Under Option-1, a same LTF sequence structure as a 5-DC tone plan may be used but with combining coefficients re-optimized. That is, in a first step, a 5-DC-tone center RU996 tone plan may be used to pick or select a segment of LTF sequence. Then, in a second step, the selected segment of LTF sequence may be mapped to the tone positions or indices of a center RU996 of a UHR-LTF with more than a predetermined number of (e.g., more than five) DC tones (e.g., seven, nine, eleven or another number, such as twenty-three DC tones as shown in FIG. 6), and then the UHR-LTF may be transmitted (e.g., from STA 110 to STA 120, or vice versa). The two-step operation may only be applied to the center RU996 or any MRU including a center RU996. In design 600, UHR-LTF240M_4×=[c(1)
*LTF$_{80MHz\_subblock\_left\_4\times}$, 0$_5$, c(2)
*LTF$_{80MHz\_subblock\_right\_4\times}$, 0$_{23}$, c(3)
*LTF$_{80MHz\_subblock\_left\_4\times}$, 0$_5$, c(4)
*LTF$_{80MHz\_subblock\_right\_4\times}$, 0$_{23}$, c(5)
*LTF$_{80MHz\_subblock\_left\_4\times}$, 0$_5$, c(6)
*LTF$_{80MHz\_subblock\_right\_4\times}$], with C=[c(1) c(2) c(3) c(4) c(5) c(6)]=[−1 −1 −1 1 1 1] or [−1 −1 1 1 1 1] or [1 1 −1 −1 −1 −1] or [1 1 1 1 −1 −1]. Here, "0$_5$" denotes five consecutive 0s, and "0$_{23}$" denotes twenty-three consecutive 0s. Moreover, LTF$_{80MHz\_subblock\_left\_4\times}$ denotes a left half of the 80 MHz subblock base sequence with the 78.125 kHz subcarrier spacing, and LTF$_{80MHz\_subblock\_right\_4\times}$ denotes a right half of the 80 MHz subblock base sequence with the 78.125 kHz subcarrier spacing.

Figure 7:
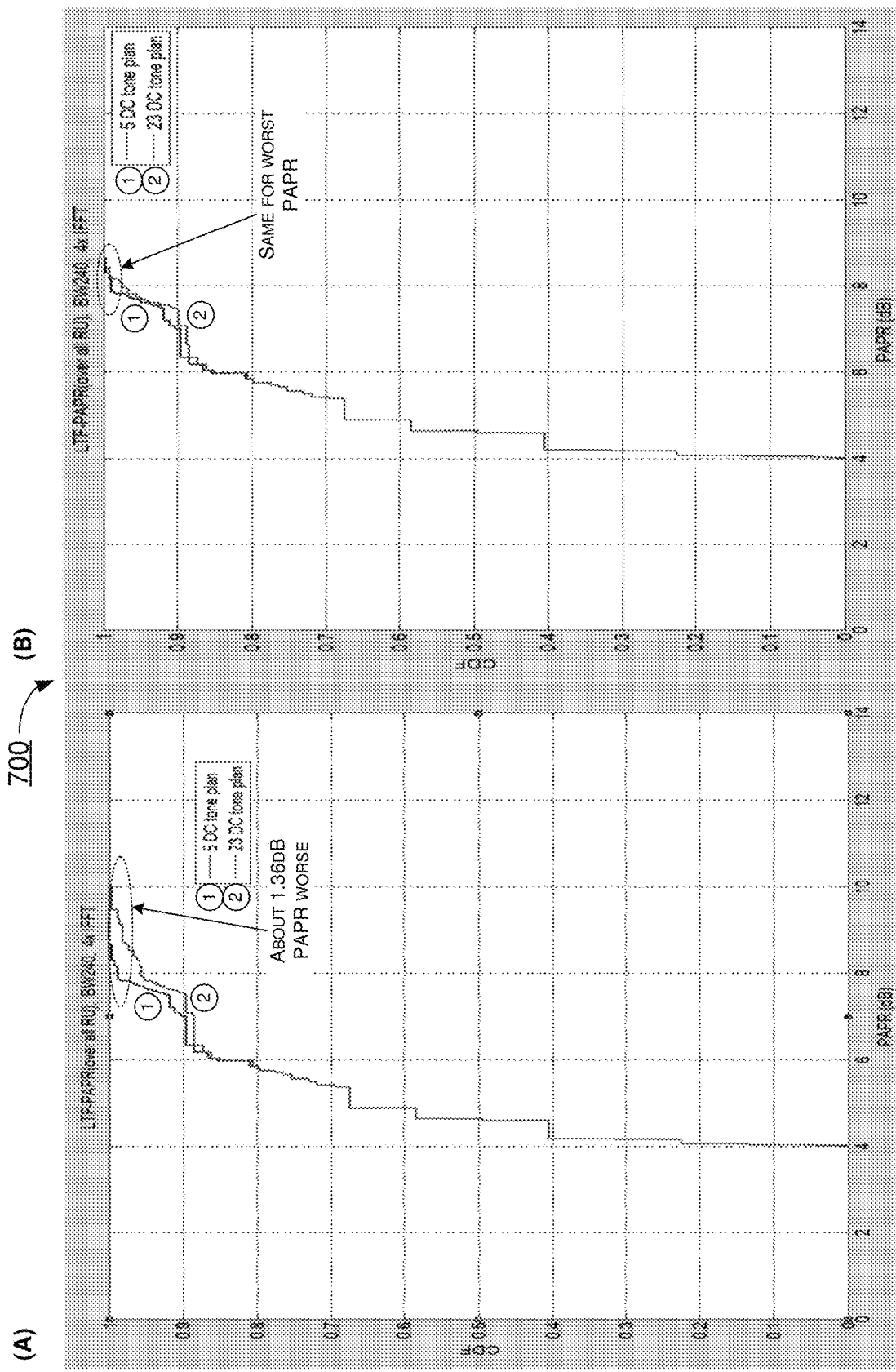
FIG. 7 is a diagram of an example scenario in accordance with an implementation of the present disclosure.

FIG. 7 illustrates an example scenario 700 under a proposed scheme in accordance with the present disclosure. Scenario 700 may pertain to a PAPR performance comparison based on simulation results under Option-1. In parts (A) and (B) of FIG. 7, the curve labeled with "1" pertains to a 5-DC tone plan and the curve labeled with "2" pertains to a 23-DC tone plan. Part (A) of FIG. 7 shows a comparison of simulation results between a 5-DC tone plan and a 23-DC tone plan using the same LTF sequence as the 5-DC tone plan. As can be seen, the worst-case PAPR of the LTF sequence of the 23-DC tone plan is about 1.36 dB higher (worse) than that of the 5-DC tone plan. Part (B) of FIG. 7 shows a comparison of simulation results between a 5-DC tone plan and a 23-DC tone plan using a re-optimized LTF sequence. As can be seen, the worst-case PAPR of the 23-DC tone plan is about the same as that of the 5-DC tone plan (i.e., no PAPR increase).

Figure 8:
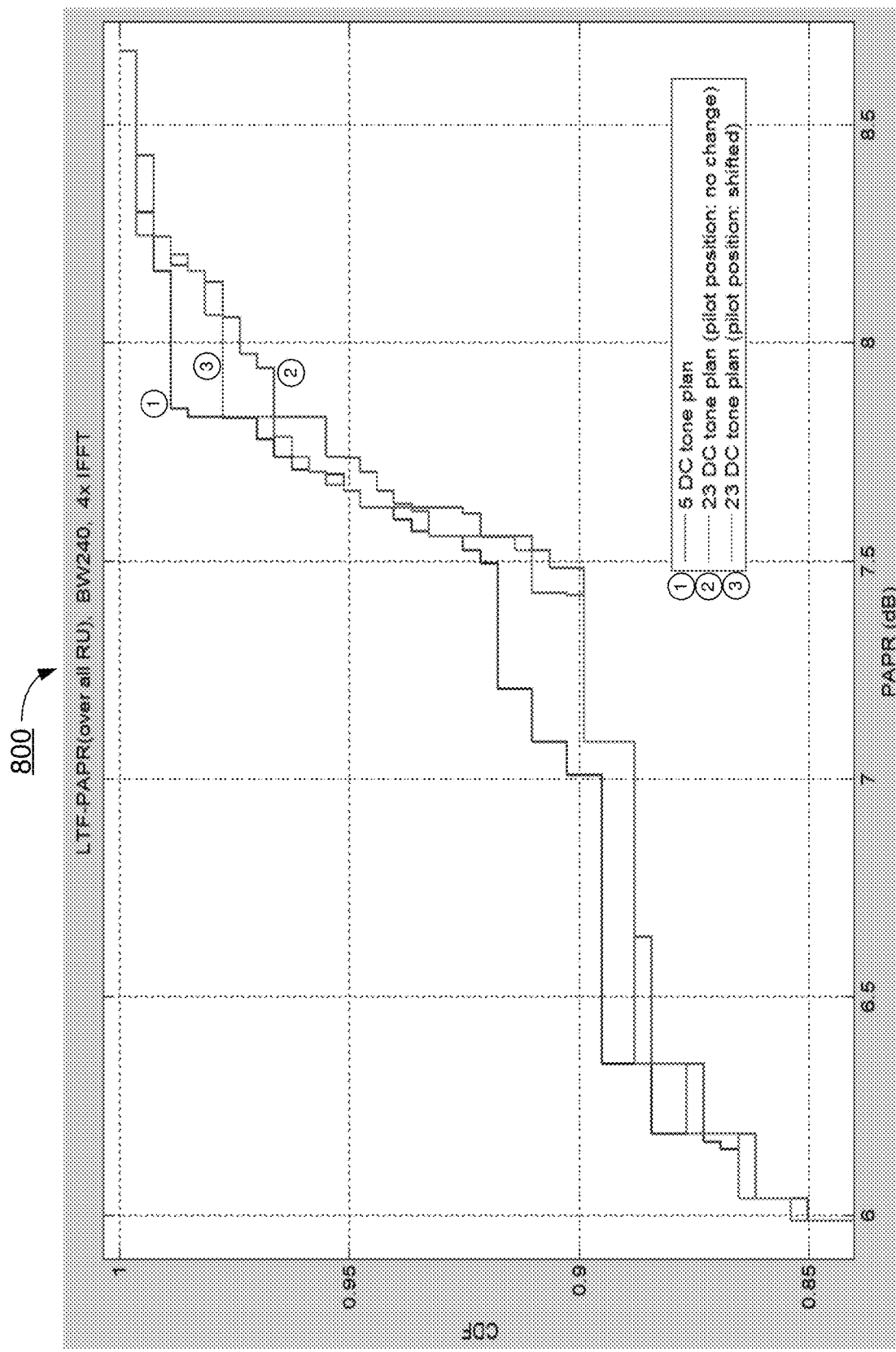
FIG. 8 is a diagram of an example scenario in accordance with an implementation of the present disclosure.

FIG. 8 illustrates an example scenario 800 under a proposed scheme in accordance with the present disclosure. Scenario 800 may pertain to a PAPR performance comparison based on simulation results. In FIG. 8, the curve labeled with "1" pertains to a 5-DC tone plan, the curve labeled with "2" pertains to a 23-DC tone plan with no change in pilot tone positions, and the curve labeled with "3" pertains to a 23-DC tone plan with pilot tone positions shifted (e.g., shifted left or right). As can be seen, compared with the 23-DC tone plan with no change in pilot tone positions, the 23-DC tone plan with pilot tone positions shifted may achieve a better PAPR. Accordingly, under a proposed scheme, the pilot tone positions of a center RU996 with more than a predetermined number of (e.g., more than five)

DC tones may be shifted to achieve better PAPR performance for transmission in BW240.

Figure 9:
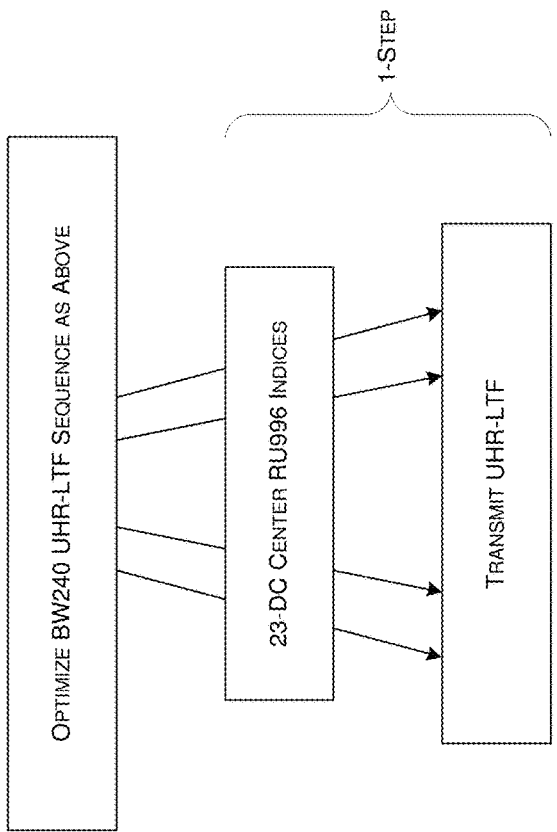
FIG. 9 is a diagram of an example design in accordance with an implementation of the present disclosure.

FIG. 9 illustrates an example design 900 in accordance with an implementation of the present disclosure. Design 900 may pertain to a one-step LTF transmission operation for BW240 with more DC tones under a third option (Option-2). Under Option-2, an LTF sequence may be constructed and optimized as shown in FIG. 9. That is, in design 900, UHR-LTF240M_4×=[c(1) *LTF$_{80MHz\_subblock\_left\_4\times}$, 0$_5$, c(2) *LTF$_{80MHz\_subblock\_right\_4\times}$, 0$_{14}$, c(3) *LTF$_{80MHz\_subblock\_left\_4\times}$, 0$_{23}$, c(4) *LTF$_{80MHz\_subblock\_right\_4\times}$, 0$_{14}$, c(5) *LTF$_{80MHz\_subblock\_left\_4\times}$, 0$_5$, c(6) *LTF$_{80MHz\_subblock\_right\_4\times}$], with C=[c(1) c(2) c(3) c(4) c(5) c(6)]=[−1 −1 −1 1 1 −1] or [−1 1 1 −1 1 1] or [1 −1 −1 1 −1 −1] or [1 1 1 −1 −1 1]. Here, "0$_5$" denotes five consecutive 0s, "0$_{14}$" denotes fourteen consecutive 0s, and "0$_{23}$" denotes twenty-three consecutive 0s. Moreover, LTF$_{80MHz\_subblock\_left\_4\times}$ denotes a left half of the 80 MHz subblock base sequence with the 78.125 kHz subcarrier spacing, and LTF$_{80MHz\_subblock\_right\_4\times}$ denotes a right half of the 80 MHz subblock base sequence with the 78.125 kHz subcarrier spacing. In design 900, tone indices of a center RU996 of the optimized BW240 UHR-LTF sequence may be mapped to corresponding tone positions or indices of a center RU996 of a UHR-LTF with more than a predetermined number of (e.g., more than five) DC tones (e.g., seven, nine, eleven or another number, such as twenty-three DC tones as shown in FIG. 9), and then the UHR-LTF may be transmitted (e.g., from STA 110 to STA 120, or vice versa).

Figure 10:
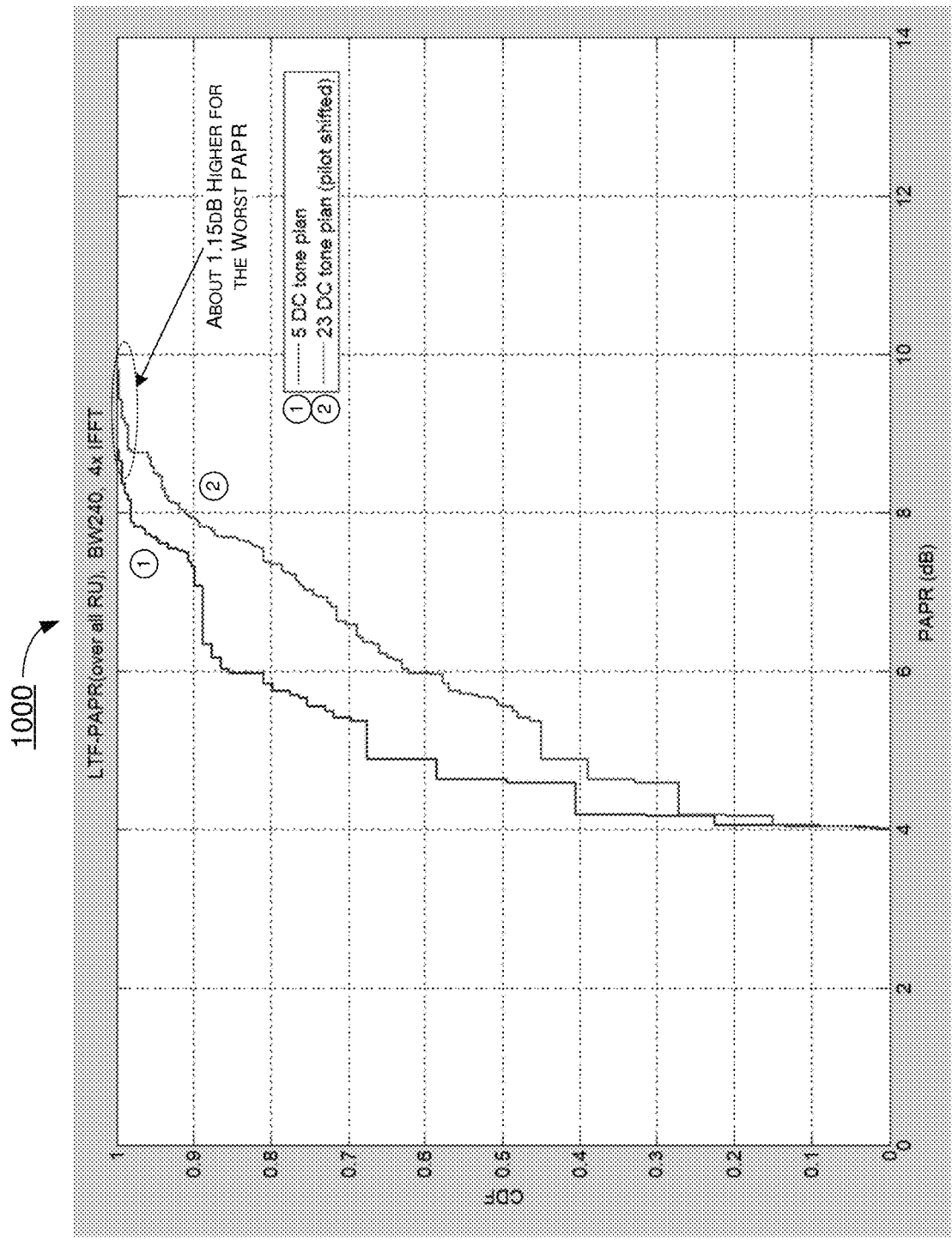
FIG. 10 is a diagram of an example scenario in accordance with an implementation of the present disclosure.

FIG. 10 illustrates an example scenario 1000 under a proposed scheme in accordance with the present disclosure. Scenario 1000 may pertain to a PAPR performance comparison based on simulation results under Option-2. In FIG. 10, the curve labeled with "1" pertains to a 5-DC tone plan and the curve labeled with "2" pertains to a 23-DC tone plan with pilot tone positions shifted (e.g., shifted left or right). As can be seen, the worst-case PAPR of the 23-DC tone plan is about 1.15 dB higher (worse) than that of the 5-DC tone plan.

Figure 11:
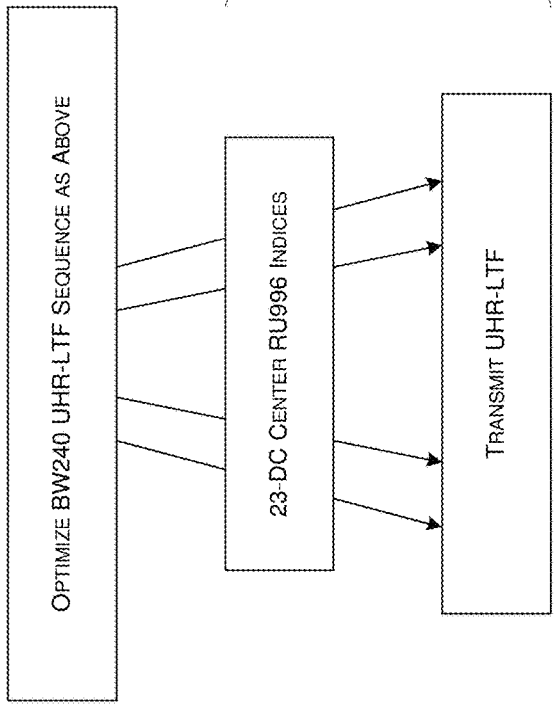
FIG. 11 is a diagram of an example design in accordance with an implementation of the present disclosure.

FIG. 11 illustrates an example design 1100 in accordance with an implementation of the present disclosure. Design 1100 may pertain to a one-step LTF transmission operation for BW240 with more DC tones under a fourth option (Option-3). Under Option-3, an LTF sequence may be constructed and optimized as shown in FIG. 11. That is, in design 1100, UHR-LTF240M_4×=[c(1) *LTF$_{80MHz\_subblock\_left\_4\times}$, 0$_5$, c(2) *LTF$_{80MHz\_subblock\_right\_4\times}$, 0$_{14}$, c(3)*L9 LTF$_{80MHz\_subblock\_left\_4\times}$, 0$_5$, c(4)*LTF$_{80MHz\_subblock\_right\_4\times}$ R9, 0$_{14}$, c(5)*LTF$_{80MHz\_subblock\_left\_4\times}$, 0$_5$, c(6) *LTF$_{80MHz\_subblock\_right\_4\times}$], with C=[c(1) c(2) c(3) c(4) c(5) c(6)]=[−1 −1 −1 −1 1 1] or [−1 −1 1 −1 1 1] or [1 1 −1 1 −1 −1] or [1 1 1 −1 −1 −1]. Here, "0$_5$" denotes five consecutive 0s, and "0$_{14}$" denotes fourteen consecutive 0s. Moreover, LTF$_{80MHz\_subblock\_left\_4\times}$ denotes a left half of the 80 MHz subblock base sequence with the 78.125 kHz subcarrier spacing, and LTF$_{80MHz\_subblock\_right\_4\times}$ denotes a right half of the 80 MHz subblock base sequence with the 78.125 kHz subcarrier spacing. Furthermore, "L9" denotes a sub-sequence of a 9-tone shift to the left-hand side (e.g., similar to the left portion of the bottom center RU996 in FIG. 4 being shifted to the left by 9 tones relative to the top center RU996 in FIG. 4), and "R9" denotes a sub-sequence of a 9-tone shift to the right-hand side (e.g., similar to the right portion of the bottom center RU996 in FIG. 4 being shifted to the right by 9 tones relative to the top center RU996 in FIG. 4). Each of the sub-sequence L9 and R9 may be either all ones (1 s) or any other sequence. In design 1100, tone indices of a center RU996 of the optimized BW240 UHR-LTF sequence may be mapped to corresponding tone positions or indices of a center RU996 of a UHR-LTF with more than a predetermined number of (e.g., more than five) DC tones (e.g., seven, nine, eleven or another number, such as twenty-three DC tones as shown in FIG. 11), and then the UHR-LTF may be transmitted (e.g., from STA 110 to STA 120, or vice versa).

Under a proposed scheme in accordance with the present disclosure, a STF sequence for BW240 with five DC tones may be provided. Under the proposed scheme, for a downlink (DL) multi-user (MU) PPDU, an optimized UHR-STF may be expressed as follows: UHRS$_{-1520:16:1520}$=[c(1) *EHTS$_{80MHz\_subblock\_1\times}$, 0, c(2)*EHTS$_{80MHz\_subblock\_1\times}$, 0, c(3)*EHTS$_{80MHz\_subblock\_1\times}$]*(1+j)/sqrt(2), with C=[c(1) c(2) c(3)]=[1 −1 −1] or [−1 −1 1] or [−1 1 1]. Moreover, for an uplink (UL) trigger-based (TB) PPDU, an optimized UHR-STF may be expressed as follows: UHRS$_{-1528:8:1528}$= [c(1)*EHTS$_{80MHz\_subblock\_2\times}$, 0, c(2) *EHTS$_{80MHz\_subblock\_2\times}$, 0, c(3)*EHTS$_{80MHz\_subblock\_2\times}$]* (1+j)/sqrt(2), with C=[c(1) c(2) c(3)]=[1 −1 −1] or [−1 −1 1] or [−1 1 1]. Here, EHTS$_{80MHz\_subblock\_1\times}$ denotes one time of an extremely-high throughput (EHT) STF (EHT-STF) 80 MHz subblock base sequence with the term "1×" referring to one time the frequency of tones in the STF relative to a legacy STF, EHTS$_{80MHZ\_subblock\_2\times}$ denotes two times (2×) of an EHT-STF 80 MHz subblock sequence with the term "2×" referring to two times the frequency of tones in the STF relative to a legacy STF. Under the proposed scheme, the values of the EHT-STF sequence at indices [−8, −1016, −1032, −2040, 2040, 1032, 1016, 8] are zero (0).

Figure 12:
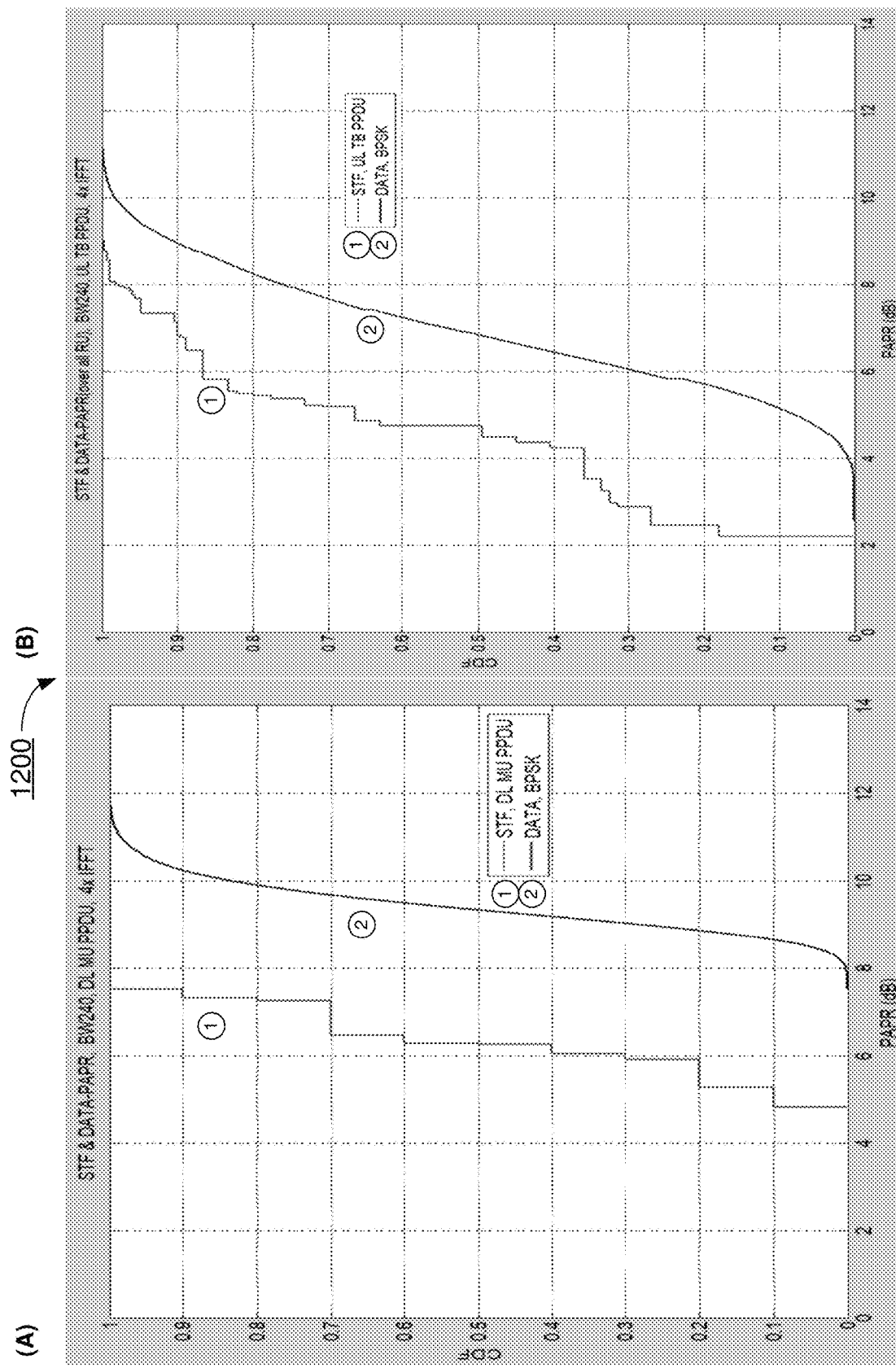
FIG. 12 is a diagram of an example scenario in accordance with an implementation of the present disclosure.

FIG. 12 illustrates an example scenario 1200 under the proposed scheme. Scenario 1200 may pertain to a PAPR performance comparison based on simulation results between a STF portion and a data portion of a PPDU in BW240 with five DC tones. The simulations were performed with MRU(2×996), MRU(2×996+484) and RU(3×996) with an assumption of >68% of spectrum allocated for DL transmission. The data portion of the PPDU may be transmitted with binary phase-shift keying (BPSK) modulation. Part (A) of FIG. 12 shows an example of comparison in the context of a DL MU PPDU. Part (B) of FIG. 12 shows an example of comparison in the context of an UL TB PPDU. In each of part (A) and part (B), the curve labeled with "1" pertains to STF and the curve labeled with "2" pertains to data. As can be seen, the PAPR of the STF portion is much lower than the PAPR of the data portion of the PPDU, which is desirable. Under the proposed scheme, the optimized UHR-STF indicated above may be reused for a BW240 RU tone plan with more than a predetermined number of (e.g., more than five) DC tones (e.g., twenty-three DC tones).

Illustrative Implementations

Figure 13:
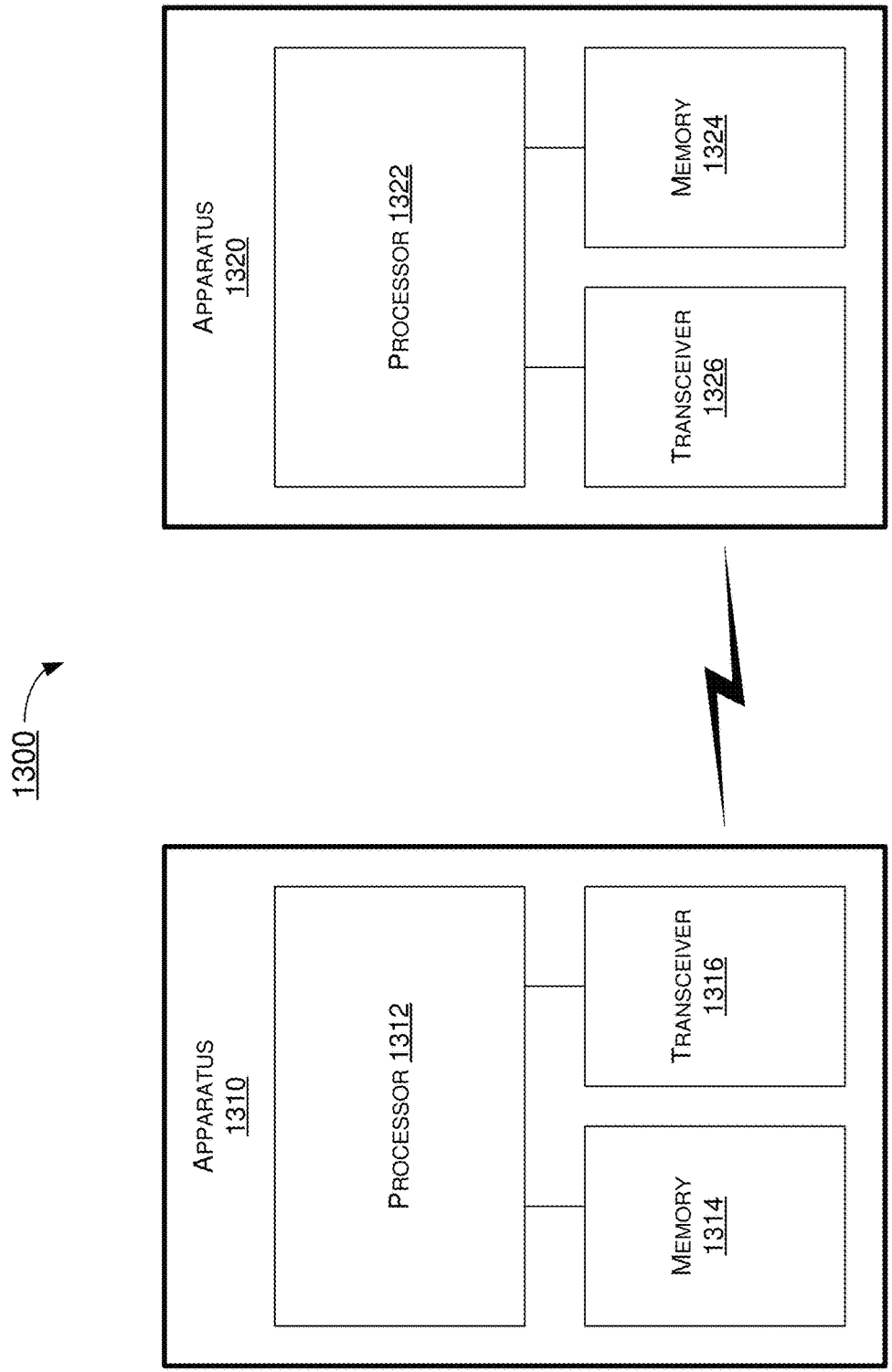
FIG. 13 is a block diagram of an example communication system in accordance with an implementation of the present disclosure.

FIG. 13 illustrates an example system 1300 having at least an example apparatus 1310 and an example apparatus 1320 in accordance with an implementation of the present disclosure. Each of apparatus 1310 and apparatus 1320 may perform various functions to implement schemes, techniques, processes and methods described herein pertaining to LTF and STF transmission for wide bandwidth 240 MHz with more DC tones in wireless communications, including the various schemes described above with respect to various proposed designs, concepts, schemes, systems and methods described above as well as processes described below. For instance, apparatus 1310 may be an example implementation of communication entity 110, and apparatus 1320 may be an example implementation of communication entity 120.

Each of apparatus 1310 and apparatus 1320 may be a part of an electronic apparatus, which may be a STA or an AP, such as a portable or mobile apparatus, a wearable apparatus, a wireless communication apparatus or a computing apparatus. For instance, each of apparatus 1310 and apparatus 1320 may be implemented in a smartphone, a smart watch, a personal digital assistant, a digital camera, or a computing equipment such as a tablet computer, a laptop computer or a notebook computer. Each of apparatus 1310 and apparatus 1320 may also be a part of a machine type apparatus, which may be an IoT apparatus such as an immobile or a stationary apparatus, a home apparatus, a wire communication apparatus or a computing apparatus. For instance, each of apparatus 1310 and apparatus 1320 may be implemented in a smart thermostat, a smart fridge, a smart door lock, a wireless speaker or a home control center. When implemented in or as a network apparatus, apparatus 1310 and/or apparatus 1320 may be implemented in a network node, such as an AP in a WLAN.

In some implementations, each of apparatus 1310 and apparatus 1320 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1310 and apparatus 1320 may be implemented in or as a STA or an AP. Each of apparatus 1310 and apparatus 1320 may include at least some of those components shown in FIG. 13 such as a processor 1312 and a processor 1322, respectively, for example. Each of apparatus 1310 and apparatus 1320 may further include one or more other components not pertinent to the proposed scheme of the present disclosure (e.g., internal power supply, display device and/or user interface device), and, thus, such component(s) of apparatus 1310 and apparatus 1320 are neither shown in FIG. 13 nor described below in the interest of simplicity and brevity.

In one aspect, each of processor 1312 and processor 1322 may be implemented in the form of one or more single-core processors, one or more multi-core processors, one or more RISC processors or one or more CISC processors. That is, even though a singular term "a processor" is used herein to refer to processor 1312 and processor 1322, each of processor 1312 and processor 1322 may include multiple processors in some implementations and a single processor in other implementations in accordance with the present disclosure. In another aspect, each of processor 1312 and processor 1322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1312 and processor 1322 is a special-purpose machine specifically designed, arranged and configured to perform specific tasks including those pertaining to LTF and STF transmission for wide bandwidth 240 MHz with more DC tones in wireless communications in accordance with various implementations of the present disclosure. For instance, each of processor 1312 and processor 1322 may be configured with hardware components, or circuitry, implementing one, some or all of the examples described and illustrated herein.

In some implementations, apparatus 1310 may also include a transceiver 1316 coupled to processor 1312. Transceiver 1316 may be capable of wirelessly transmitting and receiving data. In some implementations, apparatus 1320 may also include a transceiver 1326 coupled to processor 1322. Transceiver 1326 may include a transceiver capable of wirelessly transmitting and receiving data.

In some implementations, apparatus 1310 may further include a memory 1314 coupled to processor 1312 and capable of being accessed by processor 1312 and storing data therein. In some implementations, apparatus 1320 may further include a memory 1324 coupled to processor 1322 and capable of being accessed by processor 1322 and storing data therein. Each of memory 1314 and memory 1324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1314 and memory 1324 may include a type of read-only memory (ROM) such as mask ROM, programmable ROM (PROM), erasable programmable ROM (EPROM) and/or electrically erasable programmable ROM (EEPROM). Alternatively, or additionally, each of memory 1314 and memory 1324 may include a type of non-volatile random-access memory (NVRAM) such as flash memory, solid-state memory, ferroelectric RAM (FeRAM), magnetoresistive RAM (MRAM) and/or phase-change memory.

Each of apparatus 1310 and apparatus 1320 may be a communication entity capable of communicating with each other using various proposed schemes in accordance with the present disclosure. For illustrative purposes and without limitation, a description of capabilities of apparatus 1310, as communication entity 110, and apparatus 1320, as communication entity 120, is provided below in the context of example process 1400. It is noteworthy that, although the example implementations described below are provided in the context of WLAN, the same may be implemented in other types of networks. Thus, although the following description of example implementations pertains to a scenario in which apparatus 1310 functions as a transmitting device and apparatus 1320 functions as a receiving device, the same is also applicable to another scenario in which apparatus 1310 functions as a receiving device and apparatus 1320 functions as a transmitting device.

Illustrative Processes

Figure 14:
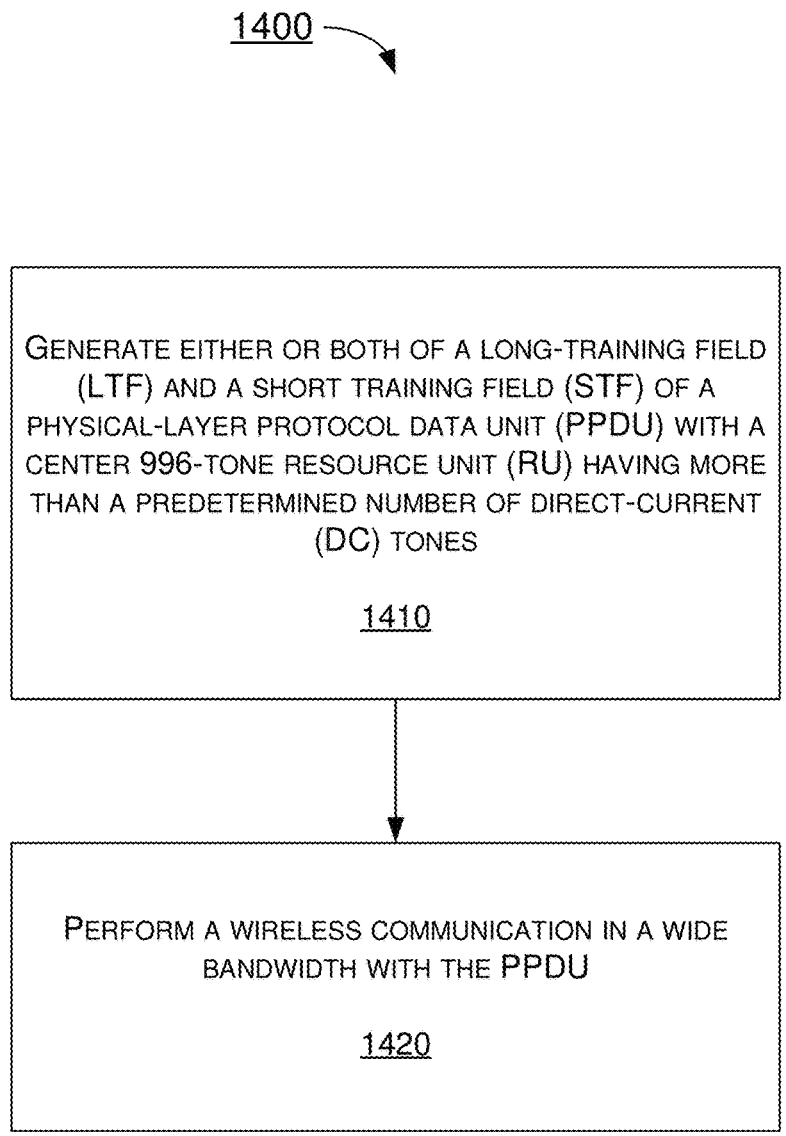
FIG. 14 is a flowchart of an example process in accordance with an implementation of the present disclosure.

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to LTF and STF transmission for wide bandwidth 240 MHz with more DC tones in wireless communications in accordance with the present disclosure. Process 1400 may include one or more operations, actions, or functions as illustrated by one or more of blocks 1410 and 1420. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively, in a different order. Furthermore, one or more of the blocks/sub-blocks of process 1400 may be executed repeatedly or iteratively. Process 1400 may be implemented by or in apparatus 1310 and apparatus 1320 as well as any variations thereof. Solely for illustrative purposes and without limiting the scope, process 1400 is described below in the context of apparatus 1310 as communication entity 110 (e.g., a transmitting device whether a STA or an AP) and apparatus 1320 as communication entity 120 (e.g., a receiving device whether a STA or an AP) of a wireless network such as a WLAN in accordance with one or more of IEEE 802.11 standards. Process 1400 may begin at block 1410.

At 1410, process 1400 may involve processor 1312 of apparatus 1310 generating either or both of an LTF and a STF of a PPDU with a center 996-tone RU having more than a predetermined number of (e.g., more than five) DC tones. Process 1400 may proceed from 1410 to 1420.

At 1420, process 1400 may involve processor 1312 performing, via transceiver 1316, a wireless communication in a wide bandwidth with the PPDU.

In some implementations, in generating either or both of the LTF and the STF of the PPDU, process 1400 may involve processor 1312 generating either or both of the LTF and the STF of the PPDU using an 80 MHz subblock base sequence such that either of the LTF and the STF is used in the wireless communication in a 240 MHz bandwidth.

In some implementations, in generating the LTF of the PPDU, process 1400 may involve processor 1312 generating the LTF using a one-step operation or a two-step operation.

In some implementations, in generating the LTF using the one-step operation, process 1400 may involve processor 1312 mapping tone indices of a center 996-tone RU (RU996) of an optimized LTF sequence to corresponding tone indices of a center RU996 of a UHR-LTF sequence with more than five DC tones.

In some implementations (Option-0), in generating the LTF using the one-step operation, process 1400 may further involve processor 1312 generating the optimized LTF sequence using a combination of optimized coefficients, with the optimized LTF sequence=[c(1) *$LTF_{80MHz\_subblock\_left\_4\times}$, $0_5$, c(2) *$LTF_{80MHz\_subblock\_right\_4\times}$, $0_{23}$, c(3) *$LTF_{80MHz\_subblock\_left\_4\times}$, $0_5$, c(4) *$LTF_{80MHz\_subblock\_right\_4\times}$, $0_{23}$, c(5) *$LTF_{80MHz\_subblock\_left\_4\times}$, $0_5$, c(6) *$LTF_{80MHz\_subblock\_right\_4\times}$], and with the combination of optimized coefficients=[c(1) c(2) c(3) c(4) c(5) c(6)]=[-1 -1 -1 1 1 1] or [-1 -1 1 -1 1 1] or [1 1 -1 1 -1 -1] or [1 1 1 -1 -1 -1]. Here, $LTF_{80MHz\_subblock\_left\_4\times}$ denotes a left half of the 80 MHz subblock base sequence with the 78.125 kHz subcarrier spacing, $LTF_{80MHz\_subblock\_right\_4\times}$ denotes a right half of the 80 MHz subblock base sequence with the 78.125 kHz subcarrier spacing, $0_5$ denotes five consecutive 0s, and $0_{23}$ denotes twenty-three consecutive 0s.

In some implementations (Option-2), in generating the LTF using the one-step operation, process 1400 may further involve processor 1312 generating the optimized LTF sequence using a combination of optimized coefficients, with the optimized LTF sequence=[c(1) *$LTF_{80MHz\_subblock\_left\_4\times}$, $0_5$, c(2) *$LTF_{80MHz\_subblock\_right\_4\times}$, $0_{14}$, c(3) *$LTF_{80MHz\_subblock\_left\_4\times}$, $0_{23}$, c(4) *$LTF_{80MHz\_subblock\_right\_4\times}$, $0_{14}$, c(5) *$LTF_{80MHz\_subblock\_left\_4\times}$, $0_5$, c(6) *$LTF_{80MHz\_subblock\_right\_4\times}$], and with the combination of optimized coefficients=[c(1) c(2) c(3) c(4) c(5) c(6)]=[-1 -1 -1 1 1 -1] or [-1 1 1 -1 1 1] or [1 -1 -1 1 -1 -1] or [1 1 1 -1 -1 1]. Here, $LTF_{80MHz\_subblock\_left\_4\times}$ denotes a left half of the 80 MHz subblock base sequence with the 78.125 kHz subcarrier spacing, $LTF_{80MHz\_subblock\_right\_4\times}$ denotes a right half of the 80 MHz subblock base sequence with the 78.125 kHz subcarrier spacing, $0_5$ denotes five consecutive 0s, $0_{14}$ denotes fourteen consecutive 0s, and $0_{23}$ denotes twenty-three consecutive 0s.

In some implementations (Option-3), in generating the LTF using the one-step operation, process 1400 may further involve processor 1312 generating the optimized LTF sequence using a combination of optimized coefficients, with the optimized LTF sequence=[c(1) *$LTF_{80MHz\_subblock\_left\_4\times}$, $0_5$, c(2) *$LTF_{80MHz\_subblock\_right\_4\times}$, $0_{14}$, c(3)*L9 $LTF_{80MHz\_subblock\_left\_4\times}$, $0_5$, c(4)*$LTF_{80MHz\_subblock\_right\_4\times}$ R9, $0_{14}$, c(5)*$LTF_{80MHz\_subblock\_left\_4\times}$, $0_5$, c(6) *$LTF_{80MHz\_subblock\_right\_4\times}$], and with the combination of optimized coefficients=[c(1) c(2) c(3) c(4) c(5) c(6)]=[-1 -1 -1 -1 1 1] or [-1 -1 1 -1 1 1] or [1 1 -1 1 -1 -1] or [1 1 1 -1 -1 -1]. Here, $LTF_{80MHz\_subblock\_left\_4\times}$ denotes a left half of the 80 MHz subblock base sequence with the 78.125 kHz subcarrier spacing, $LTF_{80MHz\_subblock\_right\_4\times}$ denotes a right half of the 80 MHz subblock base sequence with the 78.125 kHz subcarrier spacing, $0_5$ denotes five consecutive 0s, and $0_{14}$ denotes fourteen consecutive 0s.

In some implementations, in generating the LTF using the two-step operation, process 1400 may involve processor 1312 performing certain operations. For instance, process 1400 may involve processor 1312 selecting a segment of an optimized LTF sequence using a five-DC-tone center RU996 tone plan. Additionally, process 1400 may involve processor 1312 mapping the selected segment of the optimized LTF sequence to tone indices of a center RU996 of a UHR-LTF sequence with more than five DC tones.

In some implementations (Option-1), in generating the LTF using the two-step operation, process 1400 may further involve processor 1312 generating the optimized LTF sequence using a combination of optimized coefficients, with the optimized LTF sequence=[c(1) *$LTF_{80MHz\_subblock\_left\_4\times}$, $0_5$, c(2) *$LTF_{80MHz\_subblock\_right\_4\times}$, $0_{23}$, c(3) *$LTF_{80MHz\_subblock\_left\_4\times}$, $0_5$, c(4) *$LTF_{80MHz\_subblock\_right\_4\times}$, $0_{23}$, c(5) *$LTF_{80MHz\_subblock\_left\_4\times}$, $0_5$, c(6) *$LTF_{80MHz\_subblock\_right\_4\times}$], and with the combination of optimized coefficients=[c(1) c(2) c(3) c(4) c(5) c(6)]=[-1 -1 -1 -1 1 1 1] or [-1 -1 1 11 1 1] or [1 1 -1 -1 -1 -1] or [1 1 1 1 -1 -1]. Here, $LTF_{80MHz\_subblock\_left\_4\times}$ denotes a left half of the 80 MHz subblock base sequence with the 78.125 kHz subcarrier spacing, $LTF_{80MHz\_subblock\_right\_4\times}$ denotes a right half of the 80 MHz subblock base sequence with the 78.125 kHz subcarrier spacing, $0_5$ denotes five consecutive 0s, and $0_{23}$ denotes twenty-three consecutive 0s.

In some implementations, in generating the STF of the PPDU, process 1400 may involve processor 1312 generating an optimized STF sequence for a DL MU PPDU or an UL TB PPDU using a combination of optimized coefficients. For the DL MU PPDU, the optimized STF sequence=[c(1) *$EHTS_{80MHz\_subblock\_1\times}$, 0, c(2)*$EHTS_{80MHz\_subblock\_1\times}$, 0, c(3)*$EHTS_{80MHz\_subblock\_1\times}$]*(1+j)/sqrt(2), and the combination of optimized coefficients=[c(1) c(2) c(3)]=[1 -1 -1] or [-1 -1 1] or [-1 1 1]. For the UL TB PPDU, the optimized STF sequence=[c(1)*$EHTS_{80MHz\_subblock\_2\times}$, 0, c(2) *$EHTS_{80MHZ\_subblock\_2\times}$, 0, c(3)*$EHTS_{80MHz\_subblock\_2\times}$]* (1+j)/sqrt(2), and the combination of optimized coefficients=[c(1) c(2) c(3)]=[1 -1 -1] or [-1 -1 1] or [-1 1 1]. Here, $EHTS_{80MHz\_subblock\_1\times}$ denotes one time of an EHT-STF 80 MHz subblock base sequence, and $EHTS_{80MHz\_subblock\_2\times}$ denotes two times of the EHT-STF 80 MHz subblock base sequence.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

generating both of a long-training field (LTF) and a short training field (STF) of a physical-layer protocol data unit (PPDU) with a center 996-tone resource unit (RU) having more than a predetermined number of direct-current (DC) tones; and performing a wireless communication in a wide bandwidth with the PPDU, wherein the generating of the LTF of the PPDU comprises generating the LTE using a one-step operation or a two-step operation, wherein the generating of the LTF using the one-step operation comprises mapping tone indices of a center 996-tone RU (RU996) of an optimized LTF sequence to corresponding tone indices of a center RU996 of an ultra-high reliability (UHR) LTF (UHR-LTF) sequence with more than five DC tones, and wherein the generating of the LTF using the two-step operation comprises:

selecting a segment of an optimized LTF sequence using a five-DC-tone center RU996 tone plan; and mapping the selected segment of the optimized LTF sequence to tone indices of a center RU996 of an ultra-high reliability (UHR) LTF (UHR-LTF) sequence with more than five DC tones.

2. The method of claim 1, wherein the generating of either or both of the LTF and the STF of the PPDU comprises generating either or both of the LTF and the STF of the PPDU using an 80 MHz subblock base sequence such that either of the LTF and the STF is used in the wireless communication in a 240 MHz bandwidth.

3. The method of claim 2, wherein the generating of the STF of the PPDU comprises generating an optimized STF sequence for a downlink (DL) multi-user (MU) PPDU or an uplink (UL) trigger-based (TB) PPDU using a combination of optimized coefficients, and wherein:

for the DL MU PPDU:

the optimized STF sequence=$[c(1)$
$*EHTS_{80MHz\_subblock\_1\times},0,c(2)$ $*EHTS_{80MHz\_subblock\_1\times},0,c(3)$
$*EHTS_{80MHz\_subblock\_1\times}]*(1+j)/\text{sqrt}(2)$, the combination of optimized coefficients=[c(1) c(2) c(3)]=[1 −1 −1] or [−1 −1 1] or [−1 1 1], for the UL TB PPDU:

the optimized STF sequence=[$c(1)$
$*EHTS_{80MHz\_subblock\_2\times},0,c(2)$
$*EHTS_{80MHz\_subblock\_2\times},0,c(3)$
$*EHTS_{80MHz\_subblock\_2\times}]*(1+j)/\text{sqrt}(2)$, the combination of optimized coefficients=[c(1) c(2) c(3)]=[1 −1 −1] or [−1 −1 1] or [−1 1 1], $EHTS_{80MHz\_subblock\_1\times}$ denotes one time of an extremely-high throughput (EHT) STF (EHT-STF) 80 MHz subblock base sequence, and $EHTS_{80MHz\_subblock\_2\times}$ denotes two times of the EHT-STF 80 MHz subblock base sequence.

4. The method of claim 1, wherein the generating of the LTF using the one-step operation further comprises generating the optimized LTF sequence using a combination of optimized coefficients, and wherein:

the optimized LTF sequence=[$c(1)$
$*LTF_{80MHz\_subblock\_left\_4\times},0_5,c(2)$
$*LTF_{80MHz\_subblock\_right\_4\times},0_{23},c(3)$
$*LTF_{80MHz\_subblock\_left\_4\times},0_5,c(4)$
$*LTF_{80MHz\_subblock\_right\_4\times},0_{23},c(5)$
$*LTF_{80MHz\_subblock\_left\_4\times},0_5,c(6)$
$*LTF_{80MHz\_subblock\_right\_4\times}$], the combination of optimized coefficients=[c(1) c(2) c(3) c(4) c(5) c(6)]=[−1 −1 −1 1 1 1] or [−1 −1 1 −1 1 1] or [1 1 −1 1 −1 −1] or [1 1 1 −1 −1 −1], $LTF_{80MHz\_subblock\_left\_4\times}$ denotes a left half of the 80 MHz subblock base sequence with the 78.125 kHz subcarrier spacing, $LTF_{80MHz\_subblock\_right\_4\times}$ denotes a right half of the 80 MHz subblock base sequence with the 78.125 kHz subcarrier spacing, $0_5$ denotes five consecutive 0s, and $0_{23}$ denotes twenty-three consecutive 0s.

5. The method of claim 1, wherein the generating of the LTF using the one-step operation further comprises generating the optimized LTF sequence using a combination of optimized coefficients, and wherein:

the optimized LTF sequence=[$c(1)$
$*LTF_{80MHz\_subblock\_left\_4\times},0_5,c(2)$
$*LTF_{80MHz\_subblock\_right\_4\times},0_{14},c(3)$
$*LTF_{80MHz\_subblock\_left\_4\times},0_{23},c(4)$
$*LTF_{80MHz\_subblock\_right\_4\times},0_{14},c(5)$
$*LTF_{80MHz\_subblock\_left\_4\times},0_5,c(6)$
$*LTF_{80MHz\_subblock\_right\_4\times}$], the combination of optimized coefficients=[c(1) c(2) c(3) c(4) c(5) c(6)]=[−1 −1 −1 1 1 −1] or [−1 1 1 −1 1 1] or [1 −1 −1 1 −1 1] or [1 1 1 −1 −1 1], $LTF_{80MHz\_subblock\_left\_4\times}$ denotes a left half of the 80 MHz subblock base sequence with the 78.125 kHz subcarrier spacing, $LTF_{80MHz\_subblock\_right\_4\times}$ denotes a right half of the 80 MHz subblock base sequence with the 78.125 kHz subcarrier spacing, $0_5$ denotes five consecutive 0s, $0_{14}$ denotes fourteen consecutive 0s, and $0_{23}$ denotes twenty-three consecutive 0s.

6. The method of claim 1, wherein the generating of the LTF using the one-step operation further comprises generating the optimized LTF sequence using a combination of optimized coefficients, and wherein:

the optimized LTF sequence=[$c(1)$
$*LTF_{80MHz\_subblock\_left\_4\times},0_5,c(2)$
$*LTF_{80MHz\_subblock\_right\_4\times},0_{14},c(3)$
$*L9LTF_{80MHz\_subblock\_left\_4\times},0_5,c(4)$
$*LTF_{80MHz\_subblock\_right\_4\times}R9,0_{14},c(5)$
$*LTF_{80MHz\_subblock\_left\_4\times},0_5,c(6)$
$*LTF_{80MHz\_subblock\_right\_4\times}$], the combination of optimized coefficients=[c(1) c(2) c(3) c(4) c(5) c(6)]=[−1 −1 −1 −1 1 1] or [−1 −1 1 −1 1 1] or [1 1 −1 1 −1 −1] or [1 1 1 −1 −1 −1], $LTF_{80MHz\_subblock\_left\_4\times}$ denotes a left half of the 80 MHz subblock base sequence with the 78.125 kHz subcarrier spacing, $LTF_{80MHz\_subblock\_right\_4\times}$ denotes a right half of the 80 MHz subblock base sequence with the 78.125 kHz subcarrier spacing, $0_5$ denotes five consecutive 0s, and $0_{14}$ denotes fourteen consecutive 0s.

7. The method of claim 1, wherein the generating of the LTF using the two-step operation further comprises generating the optimized LTF sequence using a combination of optimized coefficients, and wherein:

the optimized LTF sequence=[$c(1)$
$*LTF_{80MHz\_subblock\_left\_4\times},0_5,c(2)$
$*LTF_{80MHz\_subblock\_right\_4\times},0_{23},c(3)$
$*LTF_{80MHz\_subblock\_left\_4\times},0_5,c(4)$
$*LTF_{80MHz\_subblock\_right\_4\times},0_{23},c(5)$
$*LTF_{80MHz\_subblock\_left\_4\times},0_5,c(6)$
$*LTF_{80MHz\_subblock\_right\_4\times}$], the combination of optimized coefficients=[c(1) c(2) c(3) c(4) c(5) c(6)]=[−1 −1 −1 −1 1 1] or [−1 −1 1 1 1 1] or [1 −1 −1 −1 1 −1] or [1 1 1 1 −1 −1], $LTF_{80MHz\_subblock\_left\_4\times}$ denotes a left half of the 80 MHz subblock base sequence with the 78.125 kHz subcarrier spacing, $LTF_{80MHz\_subblock\_right\_4\times}$ denotes a right half of the 80 MHz subblock base sequence with the 78.125 kHz subcarrier spacing, $0_5$ denotes five consecutive 0s, and $0_{23}$ denotes twenty-three consecutive 0s.

8. An apparatus, comprising:

a transceiver configured to transmit and receive wirelessly; and a processor coupled to the transceiver and configured to perform operations comprising:

generating either or both of a long-training field (LTF) and a short training field (STF) of a physical-layer protocol data unit (PPDU) with a center 996-tone resource unit (RU) having more than a predetermined number of direct-current (DC) tones; and performing a wireless communication in a wide bandwidth with the PPDU, wherein the generating of the LTF of the PPDU comprises generating the LTF using a one-step operation or a two-step operation, wherein the generating of the LTF using the one-step operation comprises mapping tone indices of a center 996-tone RU (RU996) of an optimized LTF sequence to corresponding tone indices of a center RU996 of an ultra-high reliability (UHR) LTF (UHR-LTF) sequence with more than five DC tones, and wherein the generating of the LTF using the two-step operation comprises:

selecting a segment of an optimized LTF sequence using a five-DC-tone center RU996 tone plan; and mapping the selected segment of the optimized LTF sequence to tone indices of a center RU996 of an ultra-high reliability (UHR) LTF (UHR-LTF) sequence with more than five DC tones.

9. The apparatus of claim 8, wherein the generating of either or both of the LTF and the STF of the PPDU comprises generating either or both of the LTF and the STF of the PPDU using an 80 MHz subblock base sequence such that either of the LTF and the STF is used in the wireless communication in a 240 MHz bandwidth.

10. The apparatus of claim 9, wherein the generating of the STF of the PPDU comprises generating an optimized STF sequence for a downlink (DL) multi-user (MU) PPDU or an uplink (UL) trigger-based (TB) PPDU using a combination of optimized coefficients, and wherein:

for the DL MU PPDU:

the optimized STF sequence=$[c(1)$
$*EHTS_{80MHz\_subblock\_1x}, 0, c(2)$
$EHTS_{80MHz\_subblock\_1x}, 0, c(3)$
$*EHTS_{80MHz\_subblock\_1x}]*(1+j)/\text{sqrt}(2)$, the combination of optimized coefficients=[c(1) c(2) c(3)]=[1 −1 −1] or [−1 −1 1] or [−1 1 1], for the UL TB PPDU:

the optimized STF sequence=$[c(1)$
$*EHTS_{80MHz\_subblock\_2x}, 0, c(2)$
$*EHTS_{80MHz\_subblock\_2x}, 0, c(3)$
$*EHTS_{80MHz\_subblock\_2x}]*(1+j)/\text{sqrt}(2)$, the combination of optimized coefficients=[c(1) c(2) c(3)]=[1 −1 −1] or [−1 −1 1] or [−1 1 1], $EHTS_{80MHz\_subblock\_1x}$ denotes one time of an extremely-high throughput (EHT) STF (EHT-STF) 80 MHz subblock base sequence, and $EHTS_{80MHz\_subblock\_2x}$ denotes two times of the EHT-STF 80 MHz subblock base sequence.

11. The apparatus of claim 8, wherein the generating of the LTF using the one-step operation further comprises generating the optimized LTF sequence using a combination of optimized coefficients, and wherein:

the optimized LTF sequence=$[c(1)$
$*LTF_{80MHz\_subblock\_left\_4x}, 0_5, c(2)$
$*LTF_{80MHz\_subblock\_right\_4x}, 0_{23}, c(3)$
$*LTF_{80MHz\_subblock\_left\_4x}, 0_5, c(4)$
$*LTF_{80MHz\_subblock\_right\_4x}, 0_{23}, c(5)$
$*LTF_{80MHz\_subblock\_left\_4x}, 0_5, c(6)$
$*LTF_{80MHz\_subblock\_right\_4x}]$, the combination of optimized coefficients=[c(1) c(2) c(3) c(4) c(5) c(6)]=[−1 −1 −1 1 1 1] or [−1 −1 1 −1 1 1] or [1 1 −1 1 −1 −1] or [1 1 1 −1 −1 −1], $LTF_{80MHz\_subblock\_left\_4x}$ denotes a left half of the 80 MHz subblock base sequence with the 78.125 kHz subcarrier spacing, $LTF_{80MHz\_subblock\_right\_4x}$ denotes a right half of the 80 MHz subblock base sequence with the 78.125 kHz subcarrier spacing, $0_5$ denotes five consecutive 0s, and $0_{23}$ denotes twenty-three consecutive 0s.

12. The apparatus of claim 8, wherein the generating of the LTF using the one-step operation further comprises generating the optimized LTF sequence using a combination of optimized coefficients, and wherein:

the optimized LTF sequence=$[c(1)$
$*LTF_{80MHz\_subblock\_left\_4x}, 0_5, c(2)$
$*LTF_{80MHz\_subblock\_right\_4x}, 0_{14}, c(3)$
$*LTF_{80MHz\_subblock\_left\_4x}, 0_{23}, c(4)$
$*LTF_{80MHz\_subblock\_right\_4x}, 0_{14}, c(5)$
$*LTF_{80MHz\_subblock\_left\_4x}, 0_5, c(6)$
$*LTF_{80MHz\_subblock\_right\_4x}]$, the combination of optimized coefficients=[c(1) c(2) c(3) c(4) c(5) c(6)]=[−1 −1 −1 1 1 −1] or [−1 1 1 −1 1 1] or [1 −1 −1 1 −1 −1] or [1 1 1 −1 −1 1], $LTF_{80MHz\_subblock\_left\_4x}$ denotes a left half of the 80 MHz subblock base sequence with the 78.125 kHz subcarrier spacing, $LTF_{80MHz\_subblock\_right\_4x}$ denotes a right half of the 80 MHz subblock base sequence with the 78.125 kHz subcarrier spacing, $0_5$ denotes five consecutive 0s, $0_{14}$ denotes fourteen consecutive 0s, and $0_{23}$ denotes twenty-three consecutive 0s.

13. The apparatus of claim 8, wherein the generating of the LTF using the one-step operation further comprises generating the optimized LTF sequence using a combination of optimized coefficients, and wherein:

the optimized LTF sequence=$[c(1)$
$*LTF_{80MHz\_subblock\_left\_4x}, 0_5, c(2)$
$*LTF_{80MHz\_subblock\_right\_4x}, 0_{14}, c(3)$
$*L9LTF_{80MHz\_subblock\_left\_4x}, 0_5, c(4)$
$*LTF_{80MHz\_subblock\_right\_4x}R9, 0_{14}, c(5)$
$*LTF_{80MHz\_subblock\_left\_4x}, 0_5, c(6)$
$*LTF_{80MHz\_subblock\_right\_4x}]$, the combination of optimized coefficients=[c(1) c(2) c(3) c(4) c(5) c(6)]=[−1 −1 −1 −1 1 1] or [−1 −1 1 −1 1 1] or [1 1 −1 1 −1 −1] or [1 1 1 −1 −1 −1], $LTF_{80MHz\_subblock\_left\_4x}$ denotes a left half of the 80 MHz subblock base sequence with the 78.125 kHz subcarrier spacing, $LTF_{80MHz\_subblock\_right\_4x}$ denotes a right half of the 80 MHz subblock base sequence with the 78.125 kHz subcarrier spacing, $0_5$ denotes five consecutive 0s, and $0_{14}$ denotes fourteen consecutive 0s.

14. The apparatus of claim 8, wherein the generating of the LTF using the two-step operation further comprises generating the optimized LTF sequence using a combination of optimized coefficients, and wherein:

the optimized LTF sequence=$[c(1)$
$*LTF_{80MHz\_subblock\_left\_4x}, 0_5, c(2)$
$*LTF_{80MHz\_subblock\_right\_4x}, 0_{23}, c(3)$
$*LTF_{80MHz\_subblock\_left\_4x}, 0_5, c(4)$
$*LTF_{80MHz\_subblock\_right\_4x}, 0_{23}, c(5)$
$*LTF_{80MHz\_subblock\_left\_4x}, 0_5, c(6)$
$*LTF_{80MHz\_subblock\_right\_4x}]$, the combination of optimized coefficients=[c(1) c(2) c(3) c(4) c(5) c(6)]=[−1 −1 −1 −1 1 1] or [−1 −1 1 1 1 1] or [1 1 −1 −1 −1 −1] or [1 1 1 1 −1 −1], $LTF_{80MHz\_subblock\_left\_4x}$ denotes a left half of the 80 MHz subblock base sequence with the 78.125 kHz subcarrier spacing, $LTF_{80MHz\_subblock\_right\_4x}$ denotes a right half of the 80 MHz subblock base sequence with the 78.125 kHz subcarrier spacing, $0_5$ denotes five consecutive 0s, and $0_{23}$ denotes twenty-three consecutive 0s.

15. A method, comprising:

generating both of a long-training field (LTF) and a short training field (STF) of a physical-layer protocol data unit (PPDU) with a center 996-tone resource unit (RU) having more than a predetermined number of direct-current (DC) tones; and performing a wireless communication in a wide bandwidth with the PPDU, wherein the generating of the STF of the PPDU comprises generating an optimized STF sequence for a downlink (DL) multi-user (MU) PPDU or an uplink (UL) trigger-based (TB) PPDU using a combination of optimized coefficients, and wherein:

for the DL MU PPDU:

the optimized STF sequence=$[c(1)*\text{EHTS}_{80MHz\_subblock\_1\times},0,c(2)*\text{EHTS}_{80MHz\_subblock\_1\times},0,c(3)*\text{EHTS}_{80MHz\_subblock\_1\times}]*(1+j)/\text{sqrt}(2)$, the combination of optimized coefficients=$[c(1)\ c(2)\ c(3)]$=[1 −1 −1] or [−1 −1 1] or [−1 1 1], for the UL TB PPDU:

the optimized STF sequence=$[c(1)*\text{EHTS}_{80MHz\_subblock\_2\times},0,c(2)*\text{EHTS}_{80MHz\_subblock\_2\times},0,c(3)*\text{EHTS}_{80MHz\_subblock\_2\times}]*(1+j)/\text{sqrt}(2)$, the combination of optimized coefficients=$[c(1)\ c(2)\ c(3)]$=[1 −1 −1] or [−1 −1 1] or [−1 1 1], $\text{EHTS}_{80MHz\_subblock\_1\times}$ denotes one time of an extremely-high throughput (EHT) STF (EHT-STF) 80 MHz subblock base sequence, and $\text{EHTS}_{80MHz\_subblock\_2\times}$ denotes two times of the EHT-STF 80 MHz subblock base sequence.

16. The method of claim 15, wherein the generating of the LTF of the PPDU comprises generating the LTF using a one-step operation or a two-step operation.

17. The method of claim 16, wherein the generating of the LTF using the one-step operation comprises:
mapping tone indices of a center 996-tone RU (RU996) of an optimized LTF sequence to corresponding tone indices of a center RU996 of an ultra-high reliability (UHR) LTF (UHR-LTF) sequence with more than five DC tones; and
generating the optimized LTF sequence using a combination of optimized coefficients.

18. The method of claim 16, wherein the generating of the LTF using the two-step operation comprises:
selecting a segment of an optimized LTF sequence using a five-DC-tone center RU996 tone plan; and
mapping the selected segment of the optimized LTF sequence to tone indices of a center RU996 of an ultra-high reliability (UHR) LTF (UHR-LTF) sequence with more than five DC tones.

* * * * *